(12) United States Patent
Gadkari et al.

(10) Patent No.: US 10,476,601 B2
(45) Date of Patent: *Nov. 12, 2019

(54) DYNAMIC WAVELENGTH MANAGEMENT USING BI-DIRECTIONAL COMMUNICATION FOR THE PREVENTION OF OPTICAL BEAT INTERFERENCE

(71) Applicant: Aurora Networks, Inc., San Jose, CA (US)

(72) Inventors: Ketan Gadkari, San Jose, CA (US); Zulfikar Morbi, Santa Clara, CA (US); Daryoosh Rejaly, Mountain House, CA (US); Steven Hopkins, Pleasonton, CA (US)

(73) Assignee: ARRIS Solutions, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/430,001

(22) Filed: Feb. 10, 2017

(65) Prior Publication Data

US 2017/0155453 A1    Jun. 1, 2017

Related U.S. Application Data

(63) Continuation of application No. 14/278,041, filed on May 15, 2014, now Pat. No. 9,577,767.
(Continued)

(51) Int. Cl.
*H04J 14/00*      (2006.01)
*H04B 10/572*     (2013.01)
(Continued)

(52) U.S. Cl.
CPC ....... *H04B 10/572* (2013.01); *H04B 10/2503* (2013.01); *H04B 10/2507* (2013.01);
(Continued)

(58) Field of Classification Search
CPC .............. H04B 10/572; H04B 10/2503; H04B 10/272; H04J 14/02
See application file for complete search history.

(56) References Cited

U.S. PATENT DOCUMENTS 5,880,864 A    3/1999 Williams et al.
6,407,843 B1   6/2002 Rowan et al.
(Continued)

FOREIGN PATENT DOCUMENTS

WO    2013016450 A1    1/2013

*Primary Examiner* — Dzung D Tran
(74) *Attorney, Agent, or Firm* — Carol J. Ansley

(57) ABSTRACT

Preventing optical beat interference includes dynamically managing an adjustable optical transmitter wavelength of each of a plurality of customer premises equipment, wherein each of the plurality of customer premises equipment is in bidirectional communication with a customer premises equipment controller. A bidirectional communication system includes a customer premises equipment controller; and a plurality of customer premises equipment coupled to the customer premises equipment controller, each of the plurality of customer premises equipment having an adjustable optical transmitter wavelength, wherein each of the plurality of customer premises equipment is in bidirectional communication with the customer premises equipment controller to prevent optical beat interference by dynamically managing the adjustable optical transmitter wavelength of each of the plurality of customer premises equipment.

20 Claims, 6 Drawing Sheets

Related U.S. Application Data

(60) Provisional application No. 61/822,992, filed on May 14, 2013.

(51) Int. Cl.
  *H04L 5/08* (2006.01)
  *H04B 15/00* (2006.01)
  *H04B 10/25* (2013.01)
  *H04B 10/272* (2013.01)
  *H04B 10/2507* (2013.01)
  *H04B 10/50* (2013.01)
  *H04J 14/02* (2006.01)

(52) U.S. Cl.
  CPC ......... *H04B 10/272* (2013.01); *H04B 10/503* (2013.01); *H04B 15/00* (2013.01); *H04J 14/02* (2013.01); *H04L 5/08* (2013.01)

(56) References Cited

U.S. PATENT DOCUMENTS

| | | | |
|---|---|---|---|
| 6,577,414 B1 | 6/2003 | Feldman et al. | |
| 6,637,033 B1 | 10/2003 | Cloonan et al. | |
| 9,577,767 B2 * | 2/2017 | Gadkari | H04L 5/08 |
| 2002/0080444 A1 | 6/2002 | Phillips et al. | |
| 2002/0186803 A1 | 12/2002 | Kolze | |
| 2003/0110509 A1 | 6/2003 | Levinson et al. | |
| 2005/0012106 A1 | 1/2005 | Fathimulla et al. | |
| 2005/0025485 A1 | 2/2005 | Lee et al. | |
| 2005/0025504 A1 | 2/2005 | Huang et al. | |
| 2005/0047442 A1 | 3/2005 | Volpe et al. | |
| 2005/0078958 A1 | 4/2005 | Chae et al. | |
| 2005/0172328 A1 | 8/2005 | Park et al. | |
| 2006/0098697 A1 | 5/2006 | Kim et al. | |
| 2006/0115271 A1 | 6/2006 | Hwang et al. | |
| 2007/0058989 A1 | 3/2007 | Kaku et al. | |
| 2007/0183738 A1 | 8/2007 | Welch et al. | |
| 2007/0264021 A1 | 11/2007 | Li et al. | |
| 2008/0085118 A1 | 4/2008 | Effenberger | |
| 2008/0101801 A1 | 5/2008 | Khalouf et al. | |
| 2008/0232801 A1 | 9/2008 | Arnold et al. | |
| 2009/0041459 A1 | 2/2009 | Dress et al. | |
| 2009/0317091 A1 | 12/2009 | Vogel | |
| 2010/0220994 A1 | 9/2010 | Pradzynski et al. | |
| 2011/0135309 A1 * | 6/2011 | Lee | H04B 10/2587 398/79 |
| 2012/0057875 A1 * | 3/2012 | Nagarajan | H04J 14/0246 398/82 |
| 2012/0183297 A1 * | 7/2012 | Rohde | H04B 10/0731 398/90 |
| 2013/0279914 A1 | 10/2013 | Brooks | |

* cited by examiner

DYNAMIC WAVELENGTH MANAGEMENT USING BI-DIRECTIONAL COMMUNICATION FOR THE PREVENTION OF OPTICAL BEAT INTERFERENCE

CROSS-REFERENCE TO RELATED APPLICATION

Referring to the application data sheet filed herewith, this application claims a benefit of priority under 35 U.S.C. 119(e) from provisional patent application U.S. Ser. No. 61/822,992, filed May 14, 2013, the entire contents of which are hereby expressly incorporated herein by reference for all purposes.

BACKGROUND

Businesses and consumers are demanding high speed data (HSD), voice over IP (VoIP) and video services (CATV, IPTV), therefore access communications networks need to be designed to keep up with this demand. Telephone companies and Multisystem Operators (MSOs) satisfy this demand by bringing optical fiber deeper into the network. This is typically done by deploying a passive optical network (PON) such as a fiber-to-the-premises (FITP), fiber-to-the-curb (FTTC), fiber-to-the-home (FITH) or Radio Frequency over Glass (RFoG) network to deliver these services to the subscriber.

There are two general system architectures deployed in PON networks, time-division multiple access (TDMA) and frequency-division multiple access (FDMA). The TDMA method is used in EPON or GPON networks where the customer premises equipment (CPE) or optical network unit (ONU) is assigned a time slot and transmits only within its allotted time. The FDMA method is typically found in RFoG networks. FIG. 1 shows a typical example of an RFoG network. In the downstream direction, video, and data modulated as AM-VSB and QAM RF Carriers is optically modulated by an optical transmitter, amplified in the optical domain by an erbium doped fiber amplifier (EDFA) and transported to the CPE at the subscriber site over fiber. The CPE converts the optical signal into RF and the RF signals are delivered to the set top box and cable modem over coaxial cable, lit the upstream direction, the signals carrying set top box data and upstream data from the cable modem are converted from an RF signal to an optical signal and transmitted to an optical receiver where they are converted back to RF and distributed to the upstream ports of the cable modem termination system (CMTS) and the set top box controller.

The CMTS in the multiple system operator (MSO) head-end, or hub and the cable modems at the subscriber sites form a point to multi-point communication network. In the downstream direction, the RF carriers from the CMTS are continuously on. In the upstream direction, since several cable modems communicate with the single CMTS upstream receiver, both Time Division Multiple Access (TDMA) and Frequency Division Multiple access (FDMA) are used. Multiple RF frequencies can be assigned to groups of cables modems, and within a group of cable modems that use a specific RF frequency, TDMA is used to avoid data collisions. However any two (or more) cable modems that are operating at different RF frequencies can transmit at the same time. When this happens, the lasers of the CPEs that they are connected to are also activated and there is a non-zero statistical probability that the laser wavelengths of those CPEs can overlap. It is critical to avoid this event in any RFoG system because when two (or more) optical signals of the same wavelength or with wavelengths that are close together are incident on an optical receiver, an optical effect known as Optical Beat interference (OBI) can severely degrade of the signal-to-noise ratio (SNR) over a large RF bandwidth (FIG. 2) resulting in a loss of data.

Its RFoG networks, CPE lasers operate in a burst mode configuration. When the RF level of the upstream signal crosses a threshold level, the laser is turned on. When it drops below a certain threshold level, the laser is turned off. This burst mode operation reduces the probability of OBI, but does not eliminate it, as discussed above. In HFC networks, the upstream lasers are on continuously and therefore the probability of OBI is significantly higher.

SUMMARY

There is a need for the following embodiments of the present disclosure. Of course, the present disclosure is not limited to these embodiments.

According to an embodiment of the present disclosure, a method comprises: preventing optical beat interference including dynamically managing an adjustable optical transmitter wavelength of each of a plurality of customer premises equipment, wherein each of the plurality of customer premises equipment is in bidirectional communication with a customer premises equipment controller. According to another embodiment of the present disclosure, an apparatus comprises a bidirectional communication system including: a customer premises equipment controller; and a plurality of customer premises equipment coupled to the customer premises equipment controller, each of the plurality of customer premises equipment having an adjustable optical transmitter wavelength, wherein each of the plurality of customer premises equipment is it bidirectional communication with the customer premises equipment controller to prevent optical beat interference by dynamically managing the adjustable optical transmitter wavelength of each of the plurality of customer premises equipment.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings. The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well-known techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Embodiments of this disclosure include methods, system architectures and apparatus to prevent OBI in RFoG networks or in hybrid fiber coax (HFC) networks, or in any other networks, where multiple laser transmitters can simultaneously operate over a common optical fiber connected to a shared optical receiver. The system includes a controller that resides in the headend or the hub, and a CPE that resides at the customer premises, as shown in FIG. 3.

Figure 1:
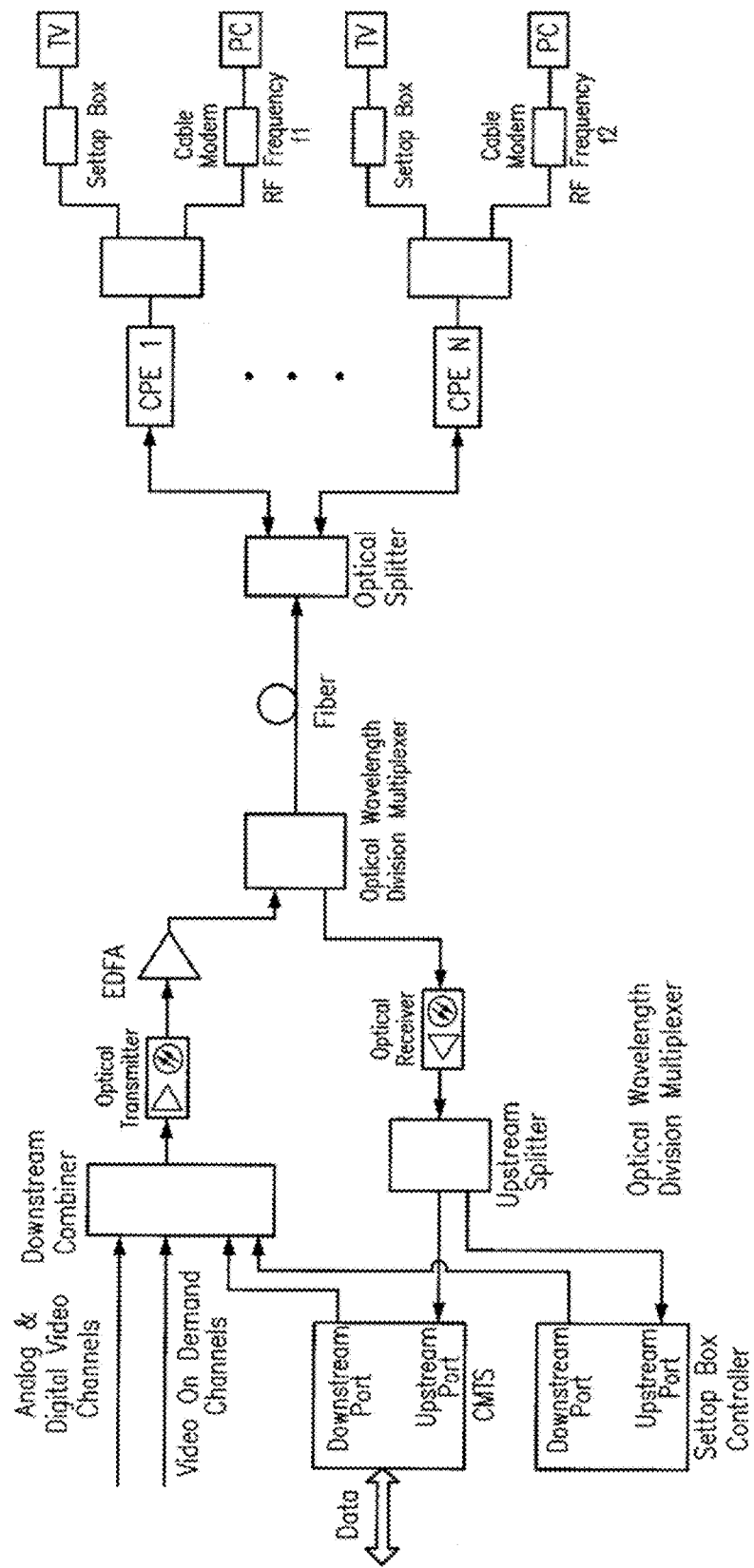
FIG. 1 is a block schematic view of an RFoG network.
Figure 2:
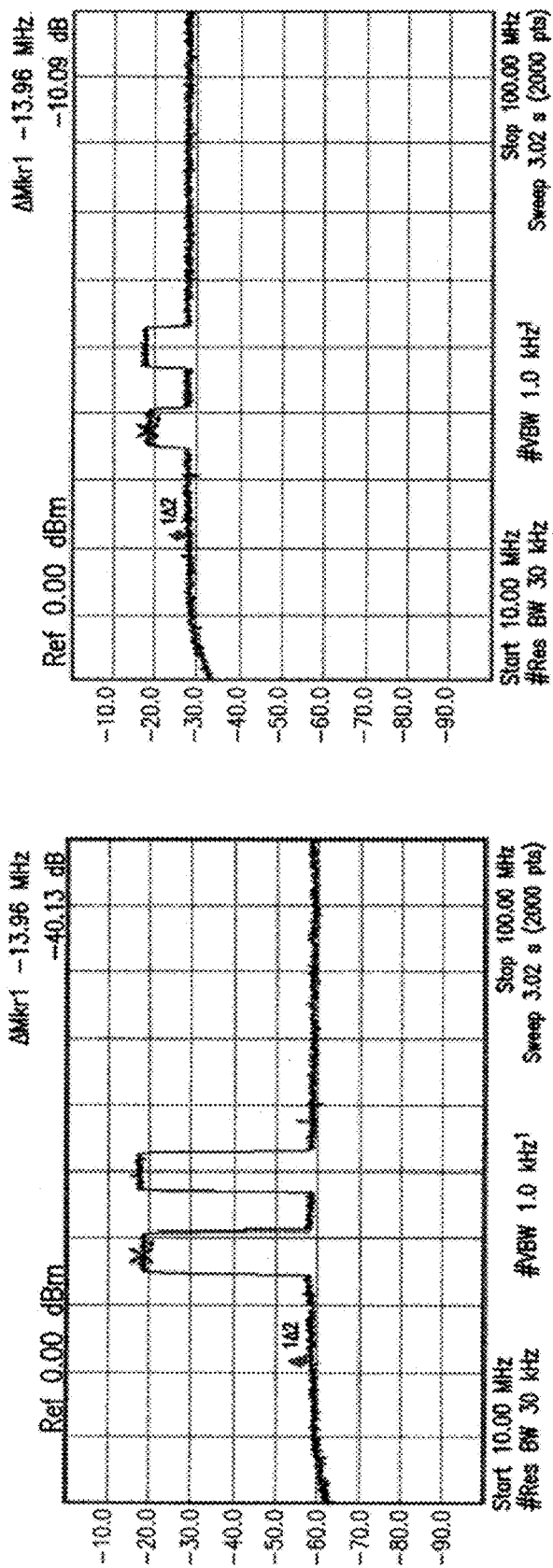
FIG. 2 shows spectrum analyzer traces of two 1550 nm lasers transmitters each modulated with a 256-QAM signal: a) SNR ratio without OBI is ∞40 dB and b) SNR ratio with OBI ~10 dB.
Figure 3:
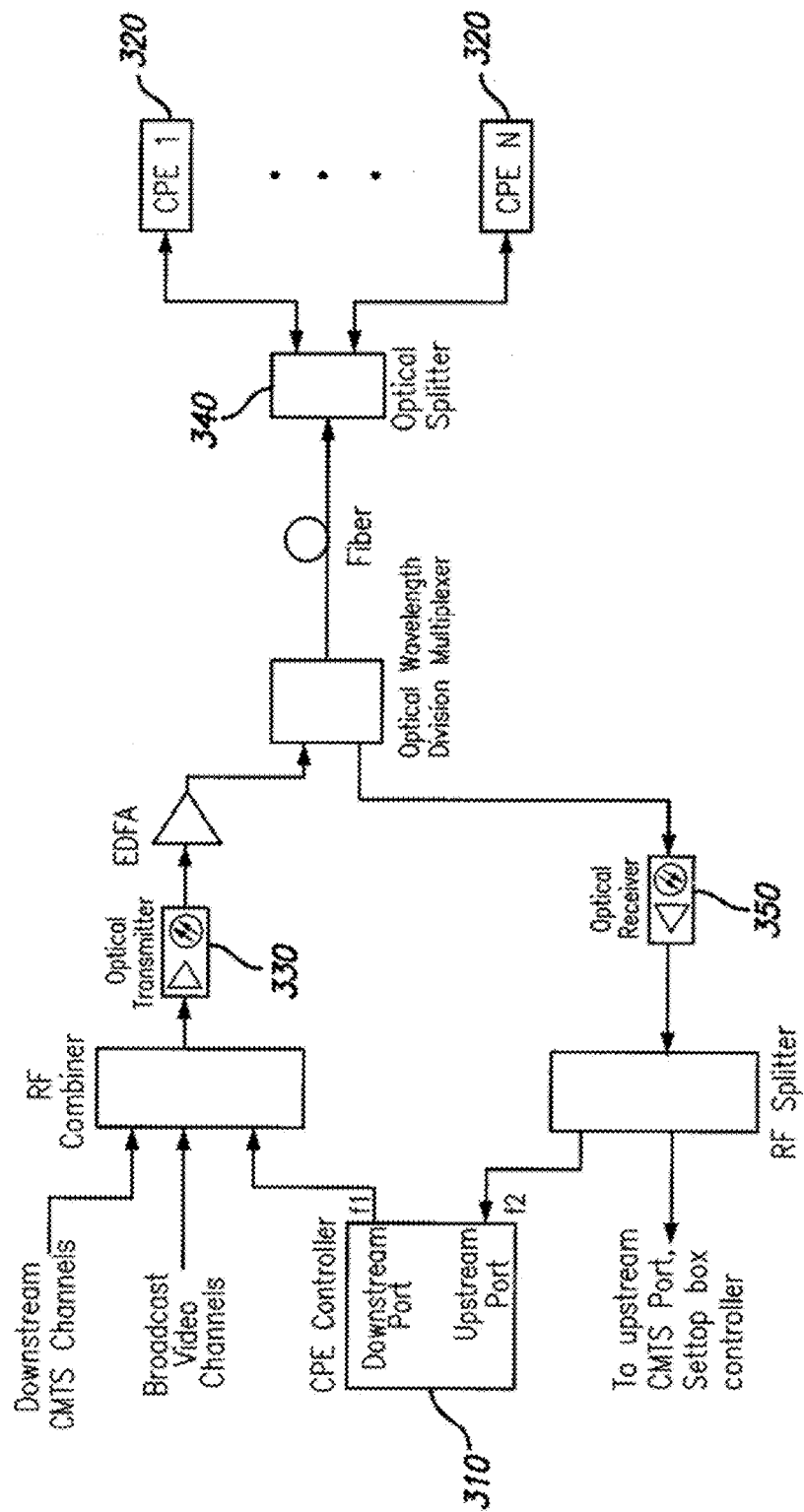
FIG. 3 is a block schematic view of an RFoG Network with a customer premises equipment and a customer premises equipment controller utilizing unique RF frequencies for downstream and upstream communication with the customer premises equipment.

Referring to FIG. 3, the controller 310 and the CPEs 320 form a bi-directional communication system. Downstream data messages from the controller are modulated on a RF carrier f1, optically modulated by the optical transmitter 330, combined onto a single fiber and delivered to the CPE through the optical splitter 340. Upstream data messages from the CPEs on f2 are delivered to the controller 310 through an optical receiver 350.

Figure 5:
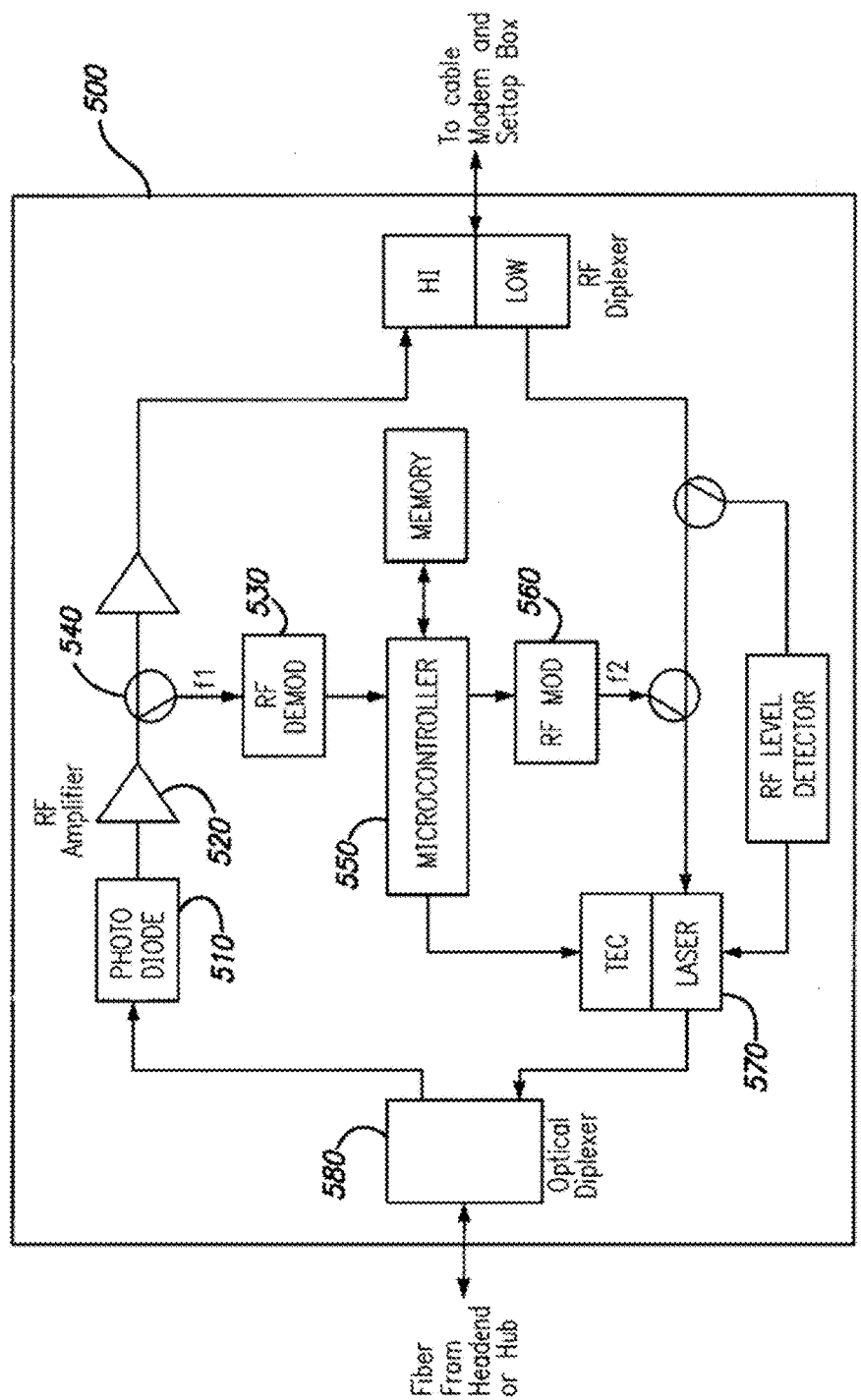
FIG. 5 is a block schematic view of an RFoG customer premises equipment.

Referring to FIG. 5, at the CPE 500 the optical signal is received by a photo diode 510, amplified by an RF amplifier 520, and delivered to a RF demodulator 530 through an RF splitter 540. The RF demodulator extracts the data stream and delivers it to the microcontroller 550. In the upstream direction, control messages from the microcontroller are modulated by an RF modulator 560 on an RF frequency f2. This RF carrier is modulated by the laser 570 and transmitted to the optical receiver 350 (shown in FIG. 3) through the optical diplexer 580, the optical fiber and the wavelength division multiplexer (not shown in FIG. 5).

Figure 4:
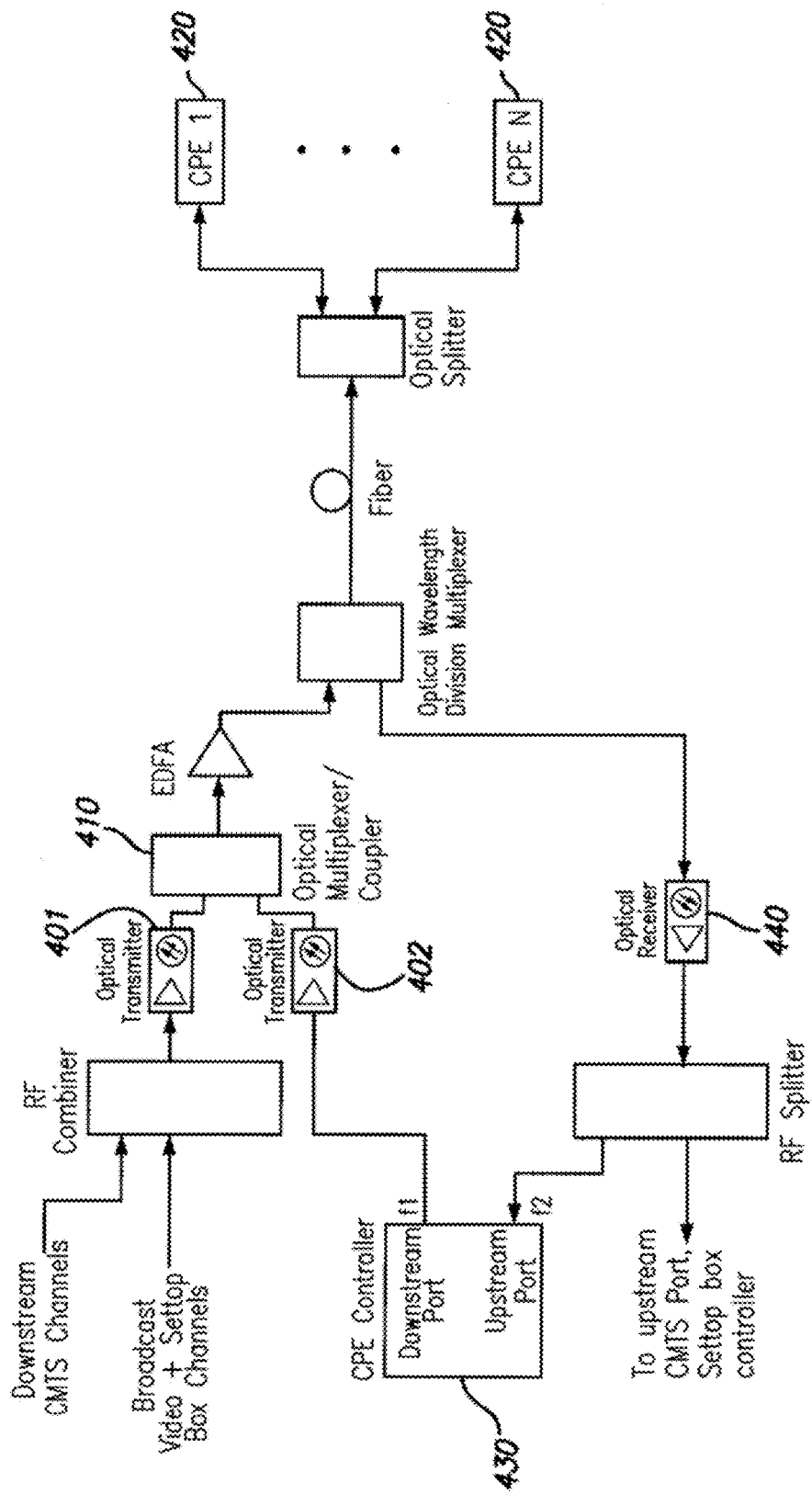
FIG. 4 is a block schematic view of an RFoG Network with the customer premises equipment controller downstream signal modulated on a separate optical transmitter.

In an alternate embodiment shown in FIG. 4, two downstream optical transmitters 401, 402 are used. One transmitter 402 is used to modulate the downstream RF signal from the controller. Another optical transmitter 401 is used to modulate the downstream video, CMTS and set top box channels. These two transmitters operate at different optical wavelengths which are combined using an optical multiplexer 410 or an optical coupler. The combined signals are amplified, and delivered to the CPE 420. It should be noted that it is not necessary for the controller 430, the optical transmitter 402 that modulates the downstream RF signal from the controller, and the optical receiver 440 to be located at the same location as the transmitter 401 that modulates the other downstream channels. They can be located at a remote location such as a node or a pedestal.

A characteristic of a laser is that its wavelength can be adjusted by changing its DC bias point or its temperature. Thus any given laser with intrinsic wavelength $\lambda_{i_0}$ at ambient temperature can access a range of wavelengths from to $\lambda_{i\_}^{min}$ to $\lambda_{i\_}^{max}$ over temperature and bias current:

$$\lambda_{i\_(min\ or\ max)} = \lambda_{i_0} + \frac{d\lambda}{dT} * \Delta T - \frac{d\lambda}{dI} * \Delta I$$

where $\Delta T = (T_{min} - T_0)$ and $\Delta I = (I_{max} - I_0(T))$ or $\Delta T = (T_{max} - T_0)$ and $\Delta I = (I_{min} - I_0(T))$ $T_0$ = ambient temperature, T is temperature
$\lambda_{i_0}$ = laser wavelength at ambient temperature
$I_0(T)$ is laser bias current at given temperature for a particular output power $$\frac{d\lambda}{dT}$$

is the change in laser wavelength as a function of temperature $$\frac{d\lambda}{dI}$$

is the change in laser wavelength as a function of laser bias current

The laser in the CPE is connected to a Thermo-Electric Cooler (TEC) that is used to change the temperature of the laser and thus its wavelength. It should be noted that besides a TEC, there are other ways to change the wavelength of the laser, such as a heater, or any other device or method that changes the wavelength of the laser. A tunable laser could also be used. It should be noted that the TEC can be mounted inside the laser.

The system works by defining a wavelength grid. The grid could include wavelength ranges, for example, known as the C-band, O-band or any CWDM wavelength band or combination of bands. It can also be defined to span the entire optical communication window from 1250 nm to 1650 nm. The range is specified by $\lambda_{start}$, $\lambda_{stop}$, and spacing between the wavelengths, $\Delta\lambda_{bin}$, is defined to be large enough to eliminate the possibility of OBI. Typically this is greater than 3 to 5 times the adiabatic chirp of the laser plus an additional amount to account for dynamic wavelength shift due to burst mode transmission and a margin for lifetime wavelength aging of a laser device. The available wavelengths are discreet positions given by $\lambda_i = \lambda_{start} + i = \Delta\lambda_{bin}$ with i=0, 1, 2, 3 . . . , M and $\lambda_M \leq \lambda_{stop}$.

During the time of manufacture, the TEC is used to change the temperature of the laser and determine which wavelengths on the grid this particular laser can be tuned to. It should be noted that any one CPE may only map onto a very small subset of the M wavelengths on the grid. A table is created that contains the list of these wavelengths, and the corresponding temperature and TEC voltage that needs to be set to tune the laser to those wavelengths. The CPE then selects its default wavelength, which is the ideal wavelength it should be operated at. This wavelength would typically be in the middle of the range of wavelengths that a CPE laser can be tuned to.

Having the CPE laser operate at the middle of the rage is preferable because it is easier for the TEC to maintain this wavelength over the entire operating temperature range of the CPE. This information about the CPE default wavelength (and the wavelengths above and below the default wavelength that the CPE can be tuned to) is then stored into the memory of the CPE. This memory can be an EEPROM, Flash, internal microcontroller memory, FPGA or any other method or device that can store information.

Figure 6:
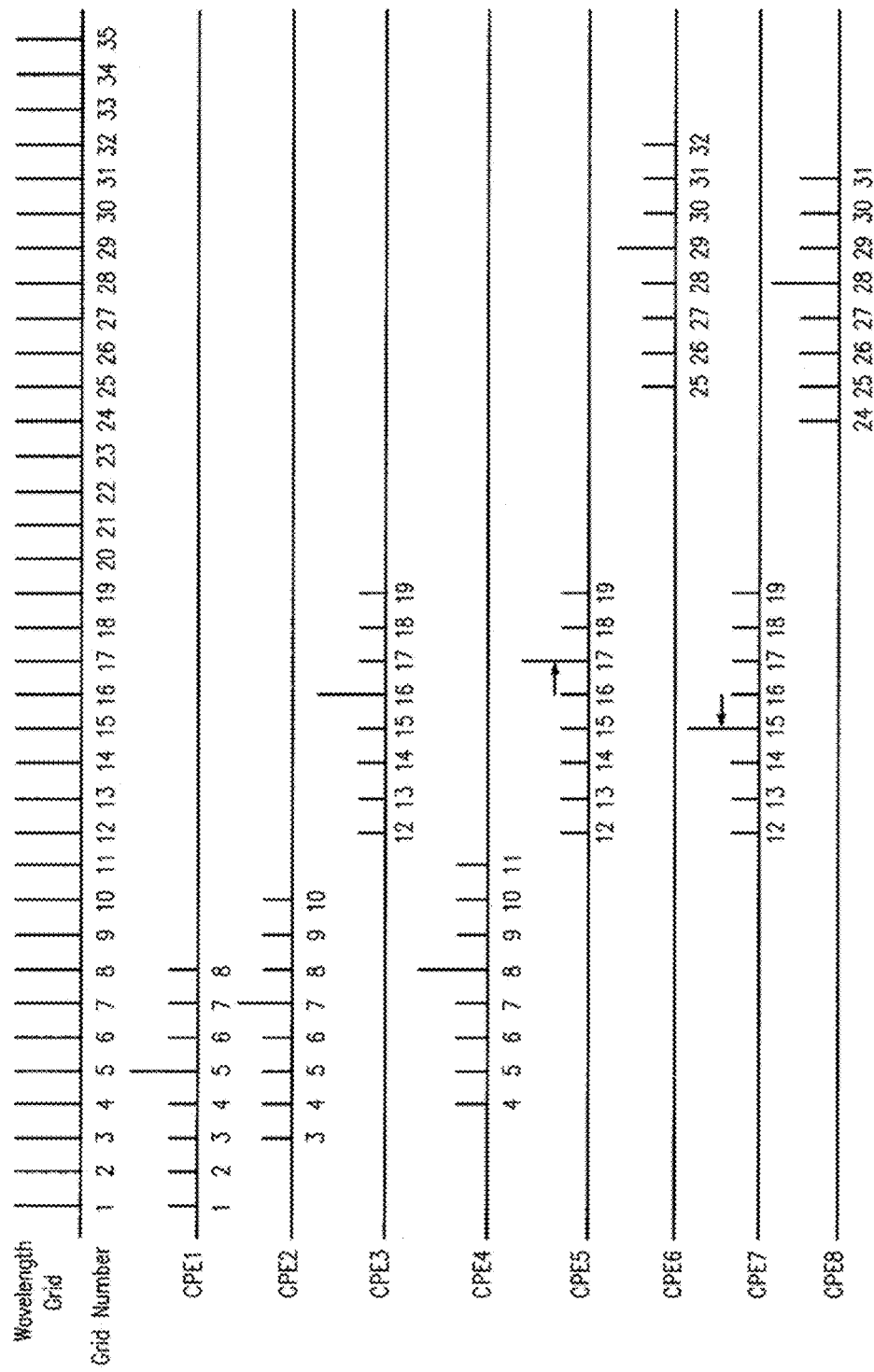
FIG. 6 is a view of a wavelength assignment process.

When the CPE is first deployed in a network, it reports its default wavelength along with the number of wavelengths above and below the default wavelength that the CPE laser can be tuned to. Along with this information, the CPE also reports its unique identifier to the controller. This identifier can be a serial number, a MAC address, an IP address, or any other set of characters unique to the CPE. The controller compares this information to its database of information containing all the CPEs connected to that optical receiver. If the default wavelength of the new CPE has not been assigned to any other CPE on the same receiver, then the controller sends a downstream control message assigning the default wavelength to the CPE. The CPE continues to operate on this default wavelength unless told by the controller to move to a different wavelength. If the default wavelength of the CPE has been assigned to another CPE connected to the same receiver, then the controller assigns to the CPE the closest available wavelength to its default wavelength. This ensures that as far as possible, the CPEs will operate at or close to their default wavelengths. FIG. 6 shows how this process would work. Since CPE1 is the first CPE to come online, it is assigned its default wavelength (λ5). CPEs 2, 3, and 4 also come online and are assigned their default wavelengths because those wavelengths have not been assigned to any other CPEs. CPE 5 comes online and its default wavelength is taken by CPE3, so CPE5 is assigned the next closest wavelength (λ17) to right of the default wavelength. CPE7 also has the same default wavelength and it is assigned the wavelength to the left of its default wavelength (λ15).

Although this method of using a default wavelength that is in the middle of the range of laser wavelengths has certain advantages as stated above, a system where the default wavelength is not in the middle of the range can also be implemented.

In another embodiment of the method, the wavelength of the CPE laser is measured at two temperatures, $T_1$ and $T_2$. The temperatures and the corresponding laser wavelengths $\lambda_1$ and $\lambda_2$ are used to create a linear equation in the form $$\lambda_k = m*T_k + b$$

Where b is the constant and in is the slope defined by:

$$m = (\lambda_2 - \lambda_1)/(T_2 - T_1)$$

The equation defines the wavelength of the laser as a function of temperature. The two data points, the slope in and the constant are stored in the CPEs memory. When the CPE is deployed for the first time, the CPE reports this information, along with its present operating wavelength and its unique identifier to the controller. The initial wavelength used by the CPE to report this information can be any wavelength that it can tune to. The controller compares this information with its database of information on the wavelengths of all other CPEs connected to this optical receiver. It then sends control messages to the CPE to either stay at the CPEs present wavelength, if it is not close enough to the wavelengths of other CPEs to cause OBI, or to move to a different wavelength that is far enough apart from the wavelengths of the other CPEs so as not to cause OBI. In this method, a wavelength grid does not have to be defined. It is also not necessary to limit the characterization of temperature and wavelength to two data points. An implementation with more data points will enable the wavelengths to be set more precisely.

One factor that limits the operating temperature range of the CPE is the heating and cooling capacity of the TEC. Given this constraint, the following approach can be used to extend the operating temperature range of the CPE. One parameter the CPE could report to the controller is its temperature. The controller can collect the temperature readings from every CPE belonging to a single N sized cluster of CPEs connected to the optical receiver and can determine the distribution of temperatures for that specific cluster. There are daily and/or seasonal variations in ambient temperature and the controller can respond to the moving envelope of temperature variations. A cluster of CPEs connected to an optical receiver is likely confined to a geographic region where the CPEs would not experience both extremes of an industrial temperature range simultaneously. When the ambient temperature moves lower than the specified low operating temperature, the controller can move every CPE, in concert to a lower wavelength. The amount of wavelength shift would depend on the amount of change in the ambient temperature. The same approach can be utilized to extend the operating temperature range on the high temperature side. This approach can also minimize the power consumption of the unit because at a lower ambient temperature, the TEC consumes less power to maintain wavelengths that are on the shorter side of the optical spectrum. Similarly, at higher ambient temperatures, the TEC consumes less power to maintain wavelengths that are on the longer side of the optical spectrum. The wavelength movement happens in a way that the CPEs will not overlap when moved. For example when cold ambient temperatures are experienced the wavelengths will be moved to the shorter values starting from the shortest wavelength one-by-one to the longest wavelength, lithe ambient temperatures move toward the hot extreme the wavelengths will be moved toward the higher value starting from the longest wavelength to the shortest.

In a 1×N network configuration, where N CPEs are connected to a single optical receiver, it is desirable to have N as large as possible. One factor that defines how large N can be is the variation in the intrinsic wavelengths of the lasers. If a group of CPEs use lasers manufactured from a single semiconductor wafer then the total available operating wavelength range for the group of lasers will be larger than the operating wavelength range of one laser from the wafer. This is because the laser chips on a wafer have a non-zero wavelength distribution. Typically the laser wavelengths across a single water follow a Gaussian distribution with a mean central wavelength of $\lambda_0$ and standard deviation of ~1 nm. If the laser transmitters are sourced from multiple wafers than the operating wavelength range could be even larger since the wafer-to-wafer mean wavelengths vary from run-to-run when comparing wafers manufactured from a single laser vendor. With multi-sourced laser vendors one could ensure a wide variation in intrinsic laser wavelengths. One could also exploit the natural wafer-to-wafer wavelength variation by building an array of 2 (or more) lasers in a single package and choosing laser chips from different wafers that have different mean central wavelengths. In another implementation one could fabricate wafers with custom wavelengths and build a laser array to include standard laser chips and custom laser chips. This allows an even larger operating wavelength range to be available to the CPE allowing the controller to decide which laser transmitter should be turned on based on the accessible wavelengths available in the network at the time the CPE comes online. The decision of which laser in the array is turned on can be done at initial startup and could be changed later as more CPEs come online and more usage statistics are gathered about the network of CPEs.

In one implementation, as the controller gains more information about the usage statistics of each subscriber the CPE wavelengths can be moved into groups or clusters of high data bandwidth users and low data bandwidth users. In the case of low data bandwidth users the adjacent wavelength spacing criteria described above can be relaxed to allow more spectral bandwidth to be opened up for new CPEs as they brought online. The relaxed criteria may only be needed when a new CPE that comes online cannot be assigned any of its accessible wavelengths because those wavelengths have been assigned to other CPEs.

The two way communication channel between the controller and the CPE can also be used to monitor wavelengths and periodic spectral position adjustments can be added to improve system performance. The improvements could be in the form of relaxing the channel spacing for low bandwidth users or making corrections for aging of the laser. This could be done with an optical spectrum analyzer, an optical channel monitor or other wavelength monitoring device. The monitoring device could be shared within one group of N transmitters in a cluster or it could be shared among multiple groups of N sized clusters.

Embodiments of the present disclosure can include method and system architecture, and apparatus to prevent optical beat interference in optical networks that allow multiple laser transmitters to simultaneously transmit to a shared optical receiver. Embodiments of the present disclosure can include a system that allows bi-directional communication path between the CPE and the controller over a downstream and an upstream RF frequency. Embodiments of the present disclosure can include a system where the downstream RF frequency of the controller is modulated by a separate transmitter. Embodiments of the present disclosure can include a CPE that stores laser wavelength information and determines its default wavelength from this information. Embodiments of the present disclosure can include a CPE that transmits this information to the controller. Embodiments of the present disclosure can include a controller that compares this information to the wavelength information from other CPEs and assigns to the CPE a wavelength such that OBI will not occur. Embodiments of the present disclosure can include a CPE that receives downstream control messages from the controller carrying the wavelength assignment information, demodulates them, and based on this information uses a TEC to appropriately position its optical wavelength on the wavelength grid. Embodiments of the present disclosure can include a method that uses information stored on the CPE about its laser transmitter wavelength characteristics and communicates it to the controller. Embodiments of the present disclosure can include a method that uses the full spectral bandwidth of a laser transmitter to move it away from its default wavelength if needed. Embodiments of the present disclosure can include a method that places CPE wavelengths into spectrally separated wavelength grid to prevent signal degradation from wavelength collisions of simultaneously transmitting CPEs. Embodiments of the present disclosure can include a system that monitors CPE ease temperatures and responds to daily and seasonal variations in temperature to extend the operational temperature range of the unit. Embodiments of the present disclosure can include a method to widen the spectral bandwidth available to CPE by employing an array of laser transmitters. Embodiments of the present disclosure can include a method to employ custom semiconductor wafer fabrication to widen the wavelength distribution of laser transmitters available to a CPE. Embodiments of the present disclosure can include a method that collects network data bandwidth usage statistics and moves CPE wavelengths into like-user clusters. Embodiments of the present disclosure can include a system that employs wavelength monitoring to improve system performance.

Definitions

The terms program and software and/or the phrases program elements, computer program and computer software are intended to mean a sequence of instructions designed for execution on a computer system (e.g., a program and/or computer program, may include a subroutine, a function, a procedure, an object method, an Object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz. The term light is intended to mean frequencies greater than or equal to approximately 300 GHz.

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise.

Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result. Unless otherwise defined, all technical and scientific terms used herein have the same meaning as commonly understood by one of ordinary skill in the art to which this present disclosure belongs, in case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. An apparatus, comprising a bidirectional communication system including:
   a customer premises equipment controller; and
   a plurality of customer premises equipment coupled to the customer premises equipment controller, each of the plurality of customer premises equipment having an adjustable optical transmitter wavelength and including an optical diplexer, a photodiode coupled to the optical diplexer, an RF amplifier coupled to the photodiode, an RF demodulator coupled to the RF amplifier, a microcontroller coupled to the RF demodulator, a memory coupled to the microcontroller, an RF modulator coupled to the microcontroller, and a laser coupled between the RF modulator and the optical diplexer,
   wherein each of the plurality of customer premises equipment is in bidirectional communication with the customer premises equipment controller to prevent optical beat interference by dynamically managing the adjustable optical transmitter wavelength of each of the plurality of customer premises equipment.

2. The apparatus of claim 1, further comprising an optical transmitter coupled to the customer premises controller; an optical wavelength division multiplexer coupled to the optical transmitter; and an optical splitter coupled to the optical wavelength division multiplexer.

3. The apparatus of claim 2, further comprising an RF combiner coupled between the customer premises controller and the optical transmitter.

4. The apparatus of claim 2, further comprising an optical multiplexer/coupler coupled between the optical transmitter and the optical wavelength division multiplexer.

5. The apparatus of claim 1, wherein each of the plurality of customer premises equipment includes a thermo-electric cooler coupled between the microcontroller and the laser.

6. The apparatus of claim 1, wherein each of the plurality of customer premises equipment includes a thermo-electric cooler located inside the laser.

7. The apparatus of claim 1, wherein each of the plurality of customer premises equipment includes a heater coupled to the laser.

8. The apparatus of claim 1, wherein the laser of each of the plurality of customer premises equipment is a tunable laser.

9. The apparatus of claim 1, wherein a cluster of customer premises equipment that use a thermo-electric cooler to control wavelength, are instructed by the customer premises equipment controller to change their wavelengths as a group in concert with the changes in temperature to extend an operating temperature range of the cluster of customer premises equipment and to reduce power consumption of the thermo-electric cooler.

10. The apparatus of claim 1, wherein the laser has an adjustable optical wavelength, and wherein the microcontroller is capable of dynamically managing the adjustable optical wavelength.

11. The apparatus of claim 1, wherein the microcontroller can be directed to adjust said optical wavelength to a specific wavelength.

12. A method for adjusting an optical transmitter wavelength of each of a plurality of customer premises equipment, wherein each of the plurality of customer premises equipment is in bidirectional communication with a customer premises equipment controller, and wherein a cluster of customer premises equipment that use a thermo-electric cooler to control wavelength, are instructed by the customer premises equipment controller to change their wavelengths as a group in concert with the changes in temperature to extend an operating temperature range of the cluster of customer premises equipment and to reduce power consumption of the thermo-electric cooler.

13. The method of claim 12, wherein each of the plurality of customer premises equipment is calibrated during time of manufacture to tune to a range of wavelengths.

14. The method of claim 13 wherein each of the plurality of customer premises equipment communicates the range of wavelengths to the customer premises equipment controller.

15. The method of claim 12 wherein the customer premises equipment controller maintains a database of assigned customer premises equipment wavelengths that are connected to an optical receiver of the customer premises equipment controller, and communicates to each of the plurality of customer premises equipment to tune its laser to a wavelength that has not been assigned to any other customer premises equipment connected to the optical receiver of the customer premises equipment controller.

16. The method of claim 15 wherein each of the plurality of customer premises equipment tunes its laser to the wavelength assigned to it by the controller.

17. A customer premises apparatus for optical communications comprising: an optical diplexer, a photodiode coupled to the optical diplexer, an RF amplifier coupled to the photodiode, an RF demodulator coupled to the RF amplifier, a microcontroller coupled to the RF demodulator, a memory coupled to the microcontroller, an RF modulator coupled to the microcontroller, and a laser coupled between the RF modulator and the optical diplexer, wherein the laser has an adjustable optical wavelength, and wherein the microcontroller is capable of dynamically managing the adjustable optical wavelength.

18. The apparatus of claim 17, wherein the microcontroller can be directed to adjust said optical wavelength to a specific wavelength.

19. The apparatus of claim 17, further comprising a thermo-electric cooler coupled between the microcontroller and the laser, wherein the adjustments to said optical wavelength operate to extend an operating temperature range of said apparatus and to reduce power consumption of the thermo-electric cooler.

20. The apparatus of claim 17, further comprising a thermo-electric cooler located inside the laser, wherein the adjustments to said optical wavelength operate to extend an operating temperature range of said apparatus and to reduce power consumption of the thermo-electric cooler.

* * * * *